March 13, 1934.  D. H. HEYNAU  1,950,675
FRICTION GEAR FOR STEPLESS CHANGING THE ROTATION OF A DRIVEN SHAFT
Filed Oct. 15, 1931    2 Sheets-Sheet 1
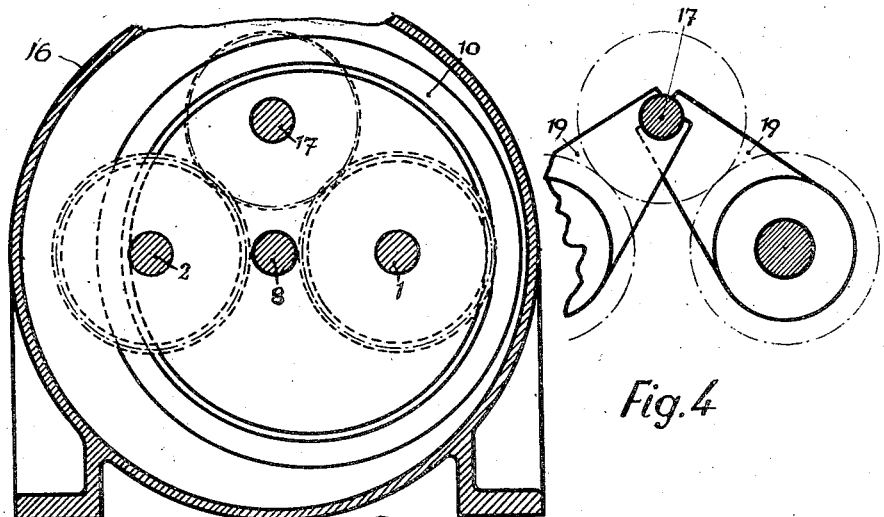
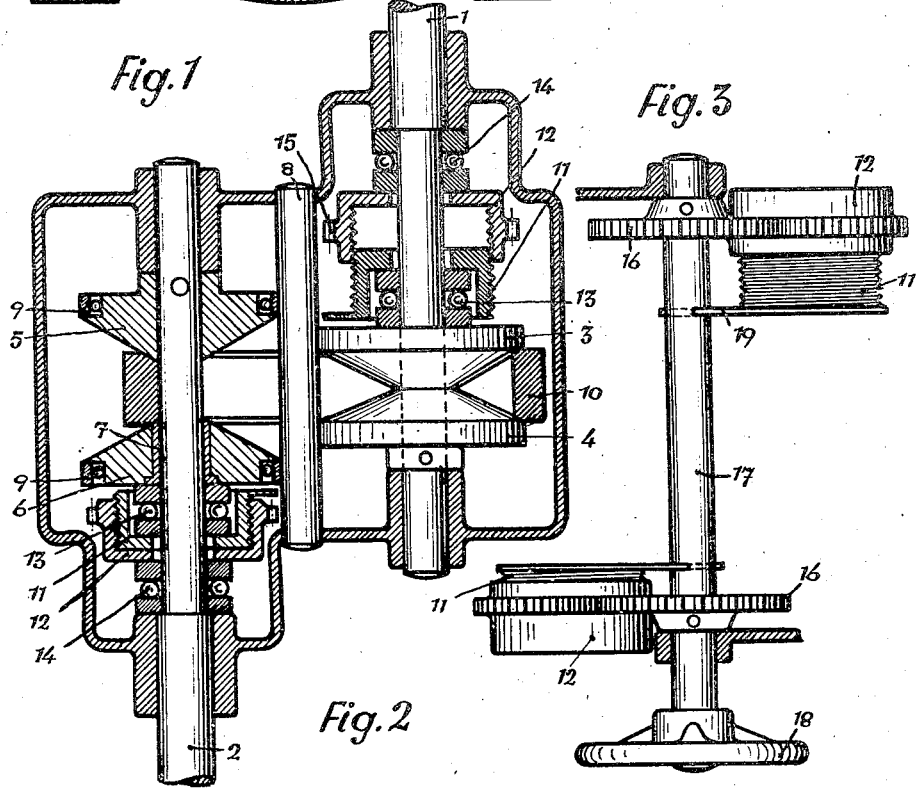
INVENTOR:
D. HANS HEYNAU
BY Ruegel & Boyce
ATTORNEYS.

March 13, 1934.  D. H. HEYNAU  1,950,675
FRICTION GEAR FOR STEPLESS CHANGING THE ROTATION OF A DRIVEN SHAFT
Filed Oct. 15, 1931  2 Sheets-Sheet 2

INVENTOR:
D. HANS HEYNAU
BY Ruege & Boyce
ATTORNEYS

Patented Mar. 13, 1934

1,950,675

UNITED STATES PATENT OFFICE 1,950,675

FRICTION GEAR FOR STEPLESS CHANGING THE ROTATION OF A DRIVEN SHAFT

David Hans Heynau, Cologne-on-the-Rhine, Germany

Application October 15, 1931, Serial No. 569,087 In Germany October 22, 1930

3 Claims. (Cl. 74—26)

This invention relates to improvements in mechanism for changing the speed of rotation of a driven shaft relative to that of a driving shaft, of the type in which a pair of bevelled members or disks are mounted on each shaft for rotation therewith and a rigid ring is used for transmitting motion from one pair of disks to the other, the principal object of the invention being to provide a device of this character in which peripheral pressure is exerted by one pair of disks on the other pair, thereby to resist radial thrust on the shafts due to the action of the motion-transmitting ring.

In the drawings accompanying this specification,

Fig. 1 is a sectional end view of a device embodying the features of the present invention;

Fig. 2 is a sectional plan view thereof;

Fig. 3 is a fragmentary plan view of a gear-shifting device forming a part of the invention;

Fig. 4 is a sectional and partly broken away end view of Fig. 3;

Figure 5:
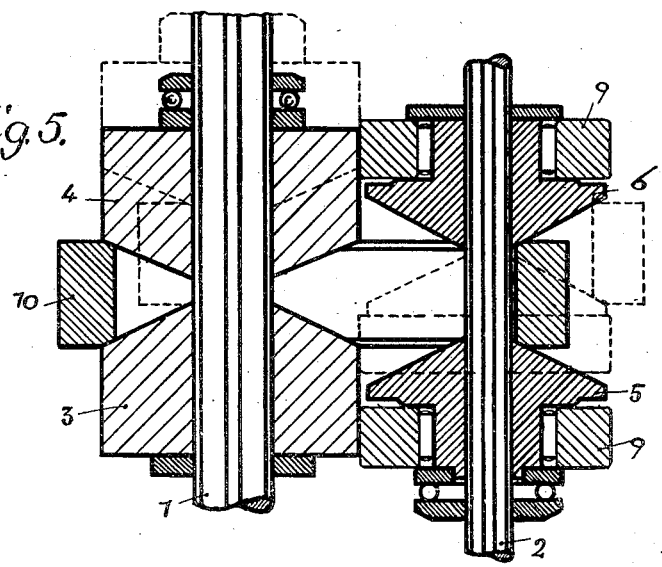
Fig. 5 is a sectional plan view of a modified form of the invention, the shafts being broken away.

In the gear according to Figs. 1–4, 1 designates the main or driving shaft with the pair of bevel disks 3, 4, and 2 is the driven or gear shaft with the pair of bevel disks 5, 6. The bevel disks 4 and 5 are fastened by means of bolts while the bevel disks 3 and 6 are movable sideways, i. e. axially shiftable. By means of gibheaded keys 7 they are connected each to its shaft so that they will rotate with them. The rims of both pairs of bevel disks are in engagement with the periphery of an intermediate roller 8 in the same plane, the pair 3, 4 directly, the pair 5, 6 by ball races 9 placed in their rims. A rigid friction ring 10 connects the two pairs of bevel disks.

For the axial shifting of the bevel disks 3 and 6 the following device is provided. The shafts 1 and 2 are each provided with an axially shiftable exteriorly threaded cup-shaped member 11 in engagement with an interiorly threaded member 12. By means of ball bearings 13 the members 11 exert pressure in axial direction on one of the bevel disks and by means of ball bearings 14 the members 12 bear against the journals of their shaft. The members 12 are each provided exteriorly thereof with a circumferential row of teeth in mesh with gears 16 secured on a control shaft 17, Fig. 3. By turning the hand wheel 18 the shaft 17 and thereby the members 12 are turned. For this reason the members 11 are axially shifted but they cannot be turned because they are secured by forks 19 spanning the control shaft 17, Figs. 3 and 4.

It will be clearly recognized that by means of this very simple gear having only small dimensions a very high driving power can be transmitted and at the same time the speed of rotation of the driven shaft can be varied within a very wide range. The value of the friction pressure between the pairs of bevel disks and the friction ring is determined only by the elasticity of the material of which these parts are made, because there is no radial pressure on bearings and in spite of the changing rate of rotation of the driven shaft only a rolling friction is possible between the bevel disks and the intermediate roller 8.

Figure 6:
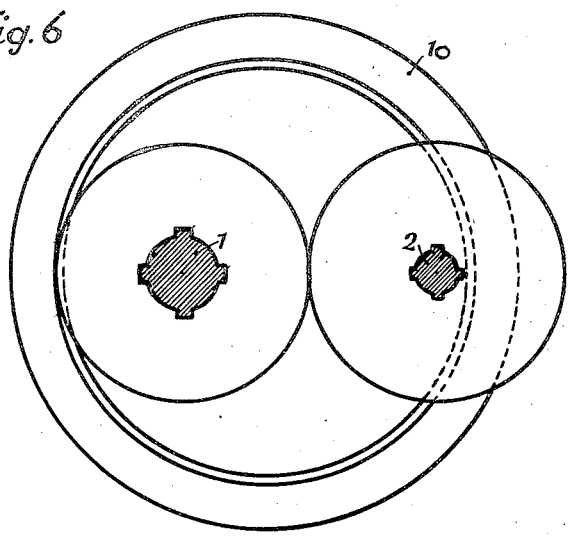
Fig. 6 is a sectional end view of the mechanism shown in Fig. 5.

The manner of construction shown in Figs. 5 and 6 is still more simple. The gear is composed of the shafts 1 and 2, the bevel disks 3, 4 and 5, 6 and the friction ring 10. The rims of the bevel disks 5, 6 are provided with broad rings 9 which are in direct peripheral contact with the rims of the bevel disks 3, 4 which are of such thickness that when the bevel disks 4 and 5 are shifted to the limit of their axial movement, as shown by dotted lines, there is still a sufficient bearing surface between them.

Having now particularly described my invention and in what manner it is to be performed I declare that what I claim is:

1. A speed-changing mechanism, comprising in combination, a driving shaft and a driven shaft, a pair of bevel disks mounted on each of said shafts for rotation therewith, one of each pair of disks being movable axially toward and from the other, a rigid friction ring engaging the bevel portions of both pairs of disks for transmitting motion from one pair to the other, means for shifting said movable disks thereby to vary the position of said ring with relation to the centers of rotation of the disks, and rotatable means actuated by the disks of one pair in peripheral contact with the disks of the other pair and effective to exert radial pressure on said disks in all axial positions of the movable disks.

2. A speed-changing mechanism, comprising in combination, a driving shaft and a driven shaft, a pair of bevel disks mounted on each of said shafts for rotation therewith, one of each pair of disks being movable axially toward and from the other, a rigid friction ring engaging the bevel portions of both pairs of disks for transmitting motion from one pair to the other, means for shifting said movable disks thereby to vary the position of said ring with relation to the centers of rotation of the disks, and a roller in peripheral engagement with both pairs of disks for transmitting radial pressure from one pair to the other in all positions of the movable disks.

3. A speed-changing mechanism, comprising in combination, a driving shaft and a driven shaft, a pair of bevel disks mounted on each of said shafts for rotation therewith, one of each pair of disks being movable axially toward and from the other, a rigid friction ring engaging the bevel portions of both pairs of disks for transmitting motion from one pair to the other, a pair of members one mounted for rotation and the other for axial movement on each of said shafts, the members of the respective pairs being in threaded engagement with each other and forming thrust bearings for said movable disks, means for simultaneously rotating the rotatable members of both pairs for shifting said movable disks thereby to vary the position of said ring with relation to the centers of rotation of the disks, and rotatable means in peripheral engagement with all of said disks for transmitting radial pressure fom one pair of disks to the other pair in all positions of the movable disks.

D. HANS HEYNAU.